(12) United States Patent
Chen et al.

(10) Patent No.: US 6,297,507 B1
(45) Date of Patent: Oct. 2, 2001

(54) SEALED TUBE NEUTRON GENERATOR INCORPORATING AN INTERNAL ASSOCIATED-ALP

(75) Inventors: Zhenpeng Chen; Sida Xu; Shengjiang Zhu; Jinglan Zhao; Jingkang Deng; Webin Zhu; Yeying Sun, all of Beijing; Xiancai Qu; Huazhang Li, both of Heilongjiang, all of (CN)

(73) Assignees: Tsinghua University, Beijing; Well Logging Company of Daqing Petroleum Administration Bureau, Daqing, both of (CH); a part interest ( * ) Notice: Subject to any disclaimer, the term of this patent is extended or adjusted under 35 U.S.C. 154(b) by 0 days.

(21) Appl. No.: 09/235,190

(22) Filed: Jan. 22, 1999

(30) Foreign Application Priority Data

Jan. 23, 1998 (CN) .................................................. 98100264
Sep. 18, 1998 (CN) .................................................. 98219005

(51) Int. Cl.[7] ................................ G01T 1/24; G01V 5/08
(52) U.S. Cl. .................................... 250/370.11; 250/269.1
(58) Field of Search .......................... 250/370.11, 269.1, 250/269.4, 269.6, 269.7, 269.8, 370.02

(56) References Cited

FOREIGN PATENT DOCUMENTS 2052573u  2/1990  (CN) .
1098763A  2/1995  (CN) .
2738669  * 3/1997  (FR) .

* cited by examiner

Primary Examiner—F L. Evans
(74) Attorney, Agent, or Firm—Schweitzer Cornman Gross & Bondell LLP (57) ABSTRACT

A sealed tube neutron generator (α-STNG) incorporates an internal associated-α detector for well logging. The α-STNG comprises a gas-tight envelope, a Penning ion source, a gas supply, an accelerating electrode and a target as those in conventional STNG; and further comprises a special target chamber, an ion leading out and focusing assembly, an annular associated -α particle detector mounted in the target chamber, a gas absorber, and a collimator for α-particles. The α-STNG can be employed within a nuclear Carbon/Oxygen Well Logging Apparatus which adopts the Associated Particle and Time of Flight Approach for collecting data to satisfy the special requirements of well logging, to expel the adverse effect resulted from cased hole materials and thermal neutrons capture for increasing the precision of carbon/oxygen ratio logged. When the carbon window is 3.17 to 4.65 Mev and the oxygen window is 4.68 to 6.43 Mev, the difference between the C/O values logged on calibration oil well and calibration water well, respectively, is more than 0.35.

15 Claims, 4 Drawing Sheets

SEALED TUBE NEUTRON GENERATOR INCORPORATING AN INTERNAL ASSOCIATED-ALP

FIELD OF THE INVENTION

The invention relates to a device for generating neutrons for well logging and more particularly to a sealed tube neutron generator incorporating an internal associated α particle detector(α-STNG). The α-STNG can be employed within a carbon/oxygen well logging apparatus which adopts the Associated-Particle and Time of Flight Approach for collecting data to satisfy the special requirement of well logging.

BACKGROUND OF THE INVENTION

In a nuclear carbon/oxygen ratio (C/O) well logging tool, a sealed tube neutron generator (STNG) is employed to provide 14 Mev fast neutrons(n) by the nuclear interaction d+t=α+n. The existing conventional STNG, for example, disclosed by CN patent No. 2052573u, consists of gas-tight insulator electrodes, a gas-tight envelope, Penning ion source, gas supply, accelerating electrode and target. Bombarding the formation with 14 Mev neutrons, prompt nelastic gamma rays of carbon (4.43 Mev) and of oxygen (6.13 Mev) are induced. By measuring the gamma ray spectrum, the atomic carbon/oxygen ratio and consequently oil saturation in the formation should be obtained under ideal conditions.

However, the C/O values logged by logging apparatus that employs a conventional STNG have large errors. The error is induced mainly by the cased-hole materials (includes cased hole fluid) that contain a large amount of the elements C, O, S and Ca. The γ rays emitted from them constitute a very high background for the gamma spectrum logged. Moreover, the γ rays from thermal neutron capture(capture-γ) also constitute the background for the inelastic γ-spectrum. These backgrounds adversely interfere with the C/O ratio logged. Although the method and apparatus that employs conventional STNG have been improved recently, the problem remains unsolved.

Figure 1A:
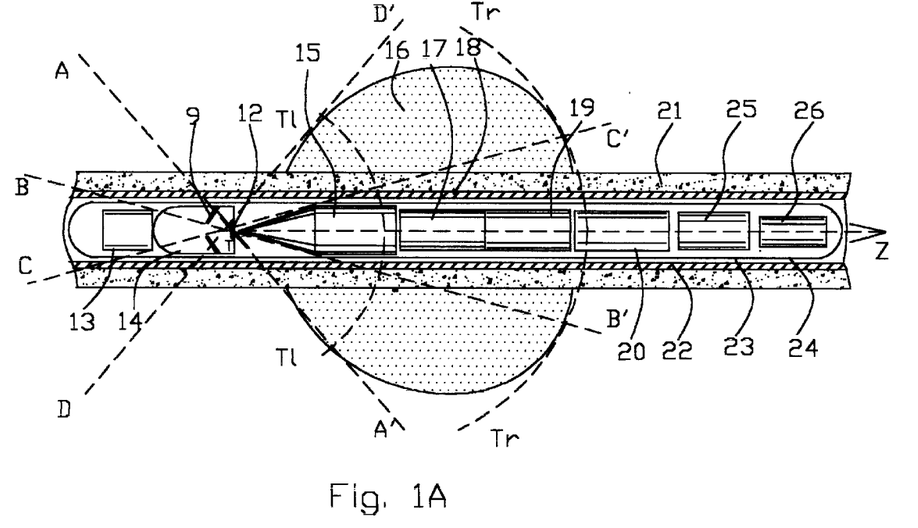
FIG. 1A is a view in longitudinal section of the Carbon/Oxygen Well Logging Apparatus that adopts associated particle and time of flight approach for collecting data and a cased hole well previously disclosed.
Figure 1B:
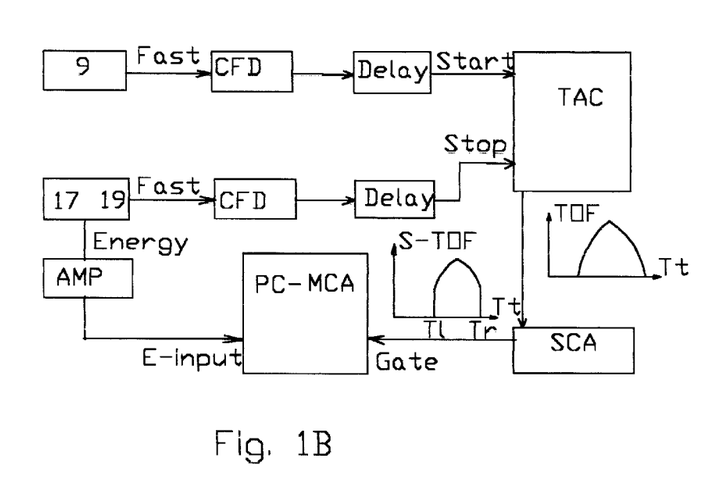
FIG. 1B is a functional block diagram illustrating the electronics for the associated-particle and time of flight approach.

CN patent application No.93109244 disclosed a novel Carbon/Oxygen Well Logging Apparatus which adopts an Associated-Particle and Time of Flight Approach for collecting data. The apparatus will be called APTF-C/O-WLA hereinafter. Referring to FIG. 1A, the APTF-C/O-WLA comprises a STNG with a α-signal acquiring device 9 (α-STNG), fast timing electronics 25, $BaF_2$ γ detector 17 and other conventional members that are used in conventional well logging apparatus. The α-signal acquiring device 9 comprises a plurality of small α-detectors that surround the incident ion beam; each small α-detector consists of a scintillator, a light guide, and a photo multiplier tube. It has been tested and verified in well logging that the APTF-C/O-WLA is able to resolve the above-mentioned problem of using conventional well logging apparatus, and to improve the precision of the C/O logged significantly. The working principle is introduced as follows:

Referring to FIG. 1A and FIG. 1B, by the T(d,n)He nuclear reaction caused by the bombardment of the deuterium ions on the target, a 3.6 Mev α-particle and an associated 14 Mev neutron are produced simultaneously and emitted in opposite directions. The direction of the α-particle specifies the subsequent trajectory of the individual neutron. When the neutron emitted forward is scattered inelastically with the materials (both cased-hole material 18 and formation 16) surrounding γ-scintillator 17, a gamma ray is emitted. The cross sections of the cased-hole material 18 and detectable formation 16 are two adjacent annuluses. Thus mounting an annular α-detector 9 before the target, and by using the Associated Particle and Time of Flight Approach, the background of the γ spectrum can be eliminated. This is explained as follows: Assume that Tt represents the total time of flight of a neutron and the γ induced by the neutron. Because the speed of γ is much faster than the speed of the neutron, then the Tt may represent the time of flight of neutron Tn approximately, and subsequently represents the distance from the target to position P where the γ is induced by the neutron. The equal-value surface of Tn may be convened to a sphere approximately. In FIG. 1A Tl and Tr represent two equal-value surfaces of Tn for predetermining the formation region to be logged. In FIG. 1B, the output signals of α detector 9 are shaped by constant-fraction discriminator (CFD) and routed through Delay to the start-input of a Time to Amplitude Convener (TAC); the γ-rays generated by inelastic neutron interactions are converted to an energy spectra with γ-detectors 17 and 19, the fast timing signals are shaped by CFD and routed through Delay to the stop-input of the TAC to provide a range-proportional, Time-of-Flight Spectrum (TOF) at TAC output (Tt). The TOF spectrum includes the contributions from the time-of-flight of the α particle and the electronics; but if the contributions are approximately constants, the TOF spectra represent approximately the relative time-of-flight spectra of the neutrons. Using SCA to select the Tl and Tr at the TOF spectrum, the signals from the portion between Tl and Tr correspond to the γ rays that occur within the formation regions of interest. From viewing their longitudinal section, the regions will be that surrounded by curved lines Tl, Tr and ray lines $T_D'$ and $T_C'$, and that surrounded by curved lines Tl, Tr and ray lines $T_A'$ and $T_B'$. The time signals mentioned above are routed to the gate input of multiple channel analyzer (MCA) to turn on the time gate, the energy signals in the γ energy spectra are routed to the E-input of MCA, so that only the energy signals of γ rays that occur within the predetermined formation region are recorded by MCA. The γ rays that occur within the cased-hole materials are not recorded at all. The reason is that a part of them has no associated-α particle (occurring within the region between rays $T_B'$ and $T_D'$), and another part of them occurs out of the region predetermined by Tl and Tr (within the region to the left of Tl). On the other hand, the procedure relative to capture-γ is a slow procedure being of the order of 10 μs; the procedure relative to inelastic prompt γ is a fast one being of the order of ns; the main point of the associated particle and time of flight approach used here is fast coincidence method; its time resolution is equal to the difference of Tr-Tl, which usually is about 8 to 10 ns. So the capture-γ induced by a thermal neutron can not be counted in MCA inevitably. It just can be counted occasionally.

Obviously, the key element of the APFT-C/O-WLA is the α-STNG, but the above CN patent application has not disclosed its specific structure. There will be described in this specification that a α-STNG suitable for using in APTF-C/O-WLA for well logging has particular structure rather different from that of a conventional STNG.

Particularly, the above mentioned CN Patent application has not disclosed the integral structure of the α-STNG that can be used with the above well logging apparatus which adopts Associated-Particle and Time of Flight Approach, the structure of the parts relative to ions beam, and the specific standards for designing and manufacturing the α-signal acquiring device and the relatively small α-detectors associated therewith. However, in order to manufacture a qualified α-signal acquiring device, the designers have to obey some particular and specific standards, which are given as follows:

(1) The associated-α detector should have the following features:

1. Possessing satisfactory geometric characteristics: that is, having wide enough sterad for accepting associated α particles; capable of distinguishing the cased-hole materials from the formation region to be logged; the optimized and predetermined formation region to be logged being located nearby and surrounding the γ-scintillator; its whole body being suitable to be used in the limited space of a cased hole well.

2. Possessing satisfactory signal characteristics: that is, output signals having high enough magnitude for distinguishing noise and other interference; output signals having short enough rise time for decreasing the uncertainty of timing; capable of providing satisfactory equal time surface of neutron flight time.

3. Possessing satisfactory manufacture process.

(2) The associated α detector usually comprises a scintillator, a light guide (if needed) and a photo multiplier tube assembly.

1. The scintillator of the α-detector in the α-STNG is a very thin layer of material, so it needs a transparent-rigid substrate for supporting it. The process for manufacturing the scintillator is: Depositing a thin layer of inorganic scintillation phosphor (e.g., ZnS, ZnO) on the surface of the selected substrate; covering it with very thin layers of an organic membrane and of Al-film on it sequentially; then heating them to remove the organic membrane: and finally vapor plating a layer of Al-film to protect the scintillation phosphor from the bombarding of scattered deuterium ions. The layers of scintillation phosphor and Al-film are called the α-scintillator. The manufacturing process requires the substrate to have an open surface, for example, a flat, or the surface of a frustum of a circular cone with large opening angle. If the surface of the substrate is the inner surface of a glass tube, it will be very difficult to make a qualified α-scintillator. The α-scintillator must have a sufficient area and satisfactory sterad for accepting α particles.

2. The area of the photo cathode of the photo multiplier tube should be as close to the area of the α-scintillator as possible. The count rate of α-signals accepted by each photo multiplier tube may be reach $2 \times 10^5$ CPS to $3 \times 10^5$ CPS; such high count rate requires the photo multiplier tube to have wide enough area of its cathode, for example, its diameter may be longer than 20 mm. To enable the photo multiplier tube to provide a high enough magnitude of signals, the photo multiplier tube must have many dynodes; this leads to the photo multiplier tube having a rather long length, which may be more than 50 mm. Based on the description above and the existing manufacture process for making high temperature photo multiplier tubes, a suitable and available photo multiplier tube assembly may have a volume larger than 24 mm diameter by 60 mm.

Figure 2:
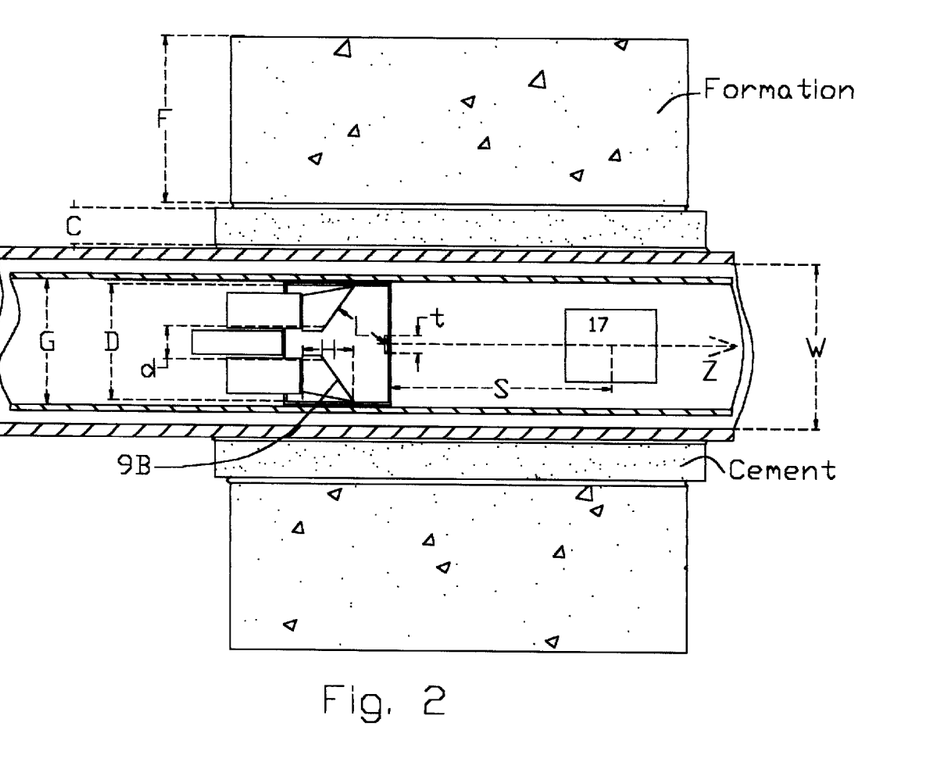
FIG. 2 is a schematic view illustrating the geometric parameters of the α-detector and cased hole well.

3. Referring to FIG. 2, the dimensions and position of the optimized formation region to be logged depends on the distances from the target to the center point of γ-scintillator 16 (usually S is longer than 300 mm), the outer diameter of cased-hole well W (usually W is about 200 mm), and the detectable depth of formation region F. The geometric characteristics of an α-detector depends on its outer diameter D, inner diameter d, the height H of the scintillator, the diameter of target t and the average distance L between the α-scintillator and the center point of the target; If the α-scintillator has three geometric degrees of freedom (D, d and H), it is easy to achieve satisfactory geometric characteristics by adjusting the D, d, H and L. For example, its shape may be similar to the outer surface of a frustum of a circular cone. If the α-scintillator has two or less geometric degrees of freedom, it is difficult to achieve satisfactory geometric characteristics; for example, its shape is similar to the inner surface of a hollow cylinder of glass. In this case, when both d and H take smaller values, the α-scintillator may have wider sterad, but the formation region to be logged will be far away from the γ-detector. When S takes a value of 300 mm and W takes 200 mm, in order to get suitable sterad and formation region to be logged, the outer diameter of α-scintillator D has to be larger than 50 mm. The inner diameter of steel housing G is usually smaller than 90 mm. Therefore, there will be no sufficient space surrounding the hollow cylinder of glass to accommodate suitable photo multiplier tubes.

(3). The Associated-Particle and Time of Flight Approach demands the diameter of target 12 to be less than 12 mm; and due to the needs of mounting target chamber and multiplier photo multiplier tubes, the ion beam transporting length in the α STNG is much longer than that in a conventional STNG; so the α-STNG needs an assembly with a special structure for leading out, focusing and transmitting the ion beam.

Moreover, the structure of the α-signal acquiring device 9 in the α-STNG 14 disclosed by the above mentioned CN patent application is rather complex; the manufacture processes thereof is rather difficult; the internal structural materials thereof are rather massive, and more gas is easy to be released during its storage and usage periods. Thus, the working life of the α-STNG is short. Therefore, further improvements are needed.

Figure 3:
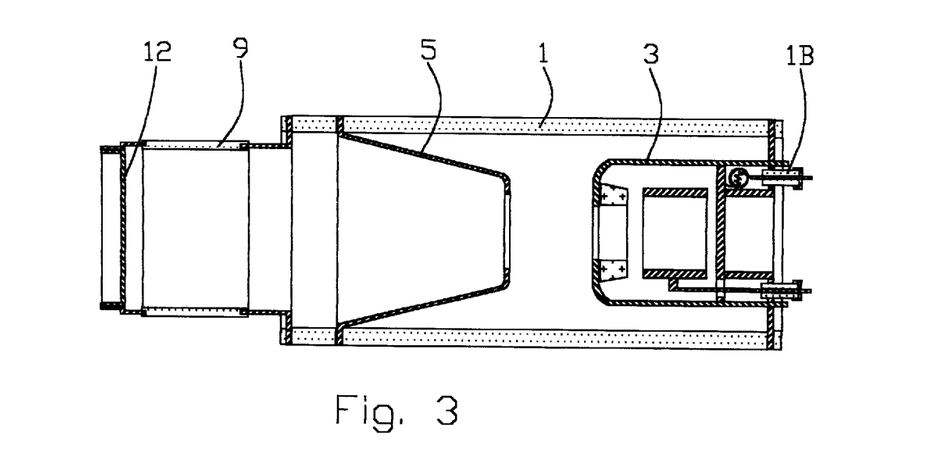
FIG. 3 is a view in longitudinal section of the sealed tube neutron generator incorporating an internal α-scintillator for well logging previously disclosed.

Another CN patent, No. CN 205273u disclosed an STNG incorporating an α scintillator for well logging (referring to FIG. 3). The STNG comprises an α-scintillator 9 welded between a target assembly 12 and a conventional STNG without target. The α-scintillator 9 is made of a hollow cylindrical tube of glass over whose inner surface a ZnS scintillator is smeared. However, this patent did not disclose how to assemble photo multiplier tubes with α-scintillator to get a really usable STNG, as there is no sufficient space surrounding the α-scintillator for accommodating suitable photo multiplier tubes, and there is no proper manufacturing process revealed for this kind of α-scintillator. Therefore, the STNG cannot be used in the APTF-C/O-WLP to satisfy the special requirement of well logging.

Moreover, the existing conventional-STNG and α-STNG have a problem that their internal high vacuum suffers from the leakage of air and the release of gases from its internal parts, inevitable during both storage and usage. Consequently its effective working life is shortened.

SUMMARY OF THE INVENTION

Thus, it is an object of the invention to provide an STNG for well logging that can be employed within the APTF-C/O-WLA to satisfy the special requirements of well logging, to remove and avoid the adverse effects resulting from cased-hole materials and thermal neutron capture and consequently to increase the precision of the carbon/oxygen ratio logged.

It is another object of the invention to provide an α-STNG for well logging that can be employed within the APTF-C/O-WLA to satisfy the special requirements of well logging, wherein the α-signal acquiring device is an integral annular detector. It has simple structure, less internal materials, easy manufacturing process, and much more flexibility for assembling photo multiplier tubes.

It is still another object of the invention to provide an α-STNG for well logging that can be employed within the APTF-C/C-WLA to satisfy the special requirements of well logging; and during storage and usage, can absorb the air leaked by itself and the gas released from internal parts; so its working life may be prolonged.

In accordance with one object of the invention there is provided a sealed tube neutron generator incorporating an internal associated α-detector for well logging (α-STNG) which comprises a gas-tight envelope 1 that has a longitudinal axis; a Penning ion source 3; a gas supply 7B; an accelerating electrode 5 and a target 12, wherein said Penning ion source 3 and said accelerating electrode 5 are mounted rigidly in said gas-tight envelope 1 coaxially with said axis, said gas supply is fixed in a gas supply chamber in said gas-tight envelope 1; it further comprises a cylindrical target chamber 10 in which said target 12 is fixed in a central recess on the bottom header 10D; an ion beam leading out and focusing assembly 4 disposed between said Penning ion source 3 and said accelerating electrode 5; an ion beam drift-tube 6 by which said gas-tight envelope 1 and said target chamber 10 rejoined coaxially with said axis; a scintillation α-detector assembly 9 which consists of n (n is an integer larger than 1) individual small scintillation α-detectors surrounding said axis and mounted between the upper header 10B and said target 12 in said target chamber 10; and a α-particle collimator 11 mounted between the α-detector 9 and the target 12 in said target chamber.

In accordance with another object of the invention there is provided a sealed tube neutron generator incorporating an internal associated α-detector for well logging which comprises a gas-tight envelope 1 that has a longitudinal axis; a Penning ion source 3; a gas supply 7B; an accelerating electrode 5 and a target 12, wherein said Penning ion source 3 and said accelerating electrode 5 are mounted in said gas-tight envelope 1 coaxially with said axis, said gas supply 7B is fixed in a gas-supply chamber in said gas-tight envelope 1; it further comprises a cylindrical target chamber 10 in which said target is fixed in the central recess on the bottom header; an ion leading out and focusing assembly 4 disposed between said Penning ion source 3 and said accelerating electrode 5; an ion beam drift-tube 6 by which said gas-tight envelope 1 and said target chamber 10 are joined together coaxially with said axis: a scintillation α-detector 9, located between said ion beam drift tube 6 and said target 12, consisting of a plurality of photo multiplier tubes 9D and an integral annular α-scintillator which is manufactured on a transparent rigid substrate taken as the upper header of said target chamber 10; a α-particle collimator 11 mounted between the α-detector 9 and the target 12 in said target chamber 10.

In accordance with still another object of the invention there is provided a α-STNG for well logging whose structure is the same as any one of the above two α-STNGs described above, except that it further includes a gas absorber 8 mounted in the α-STNG.

BRIEF DESCRIPTION OF THE DRAWINGS

The above and other objects, advantages, and features of the invention will become more apparent from the following description of preferred embodiments given with reference to the accompanying drawings, in which.

In the accompanying drawings: 1—gas-tight envelope; 1A—pinch-off tabulation; 1B—high voltage gas-tight insulator; 1C—Invar alloy tube; 1D—upper transverse header; 1E—hollow cylindrical tube of glass or ceramic: 1F—low voltage gas-tight insulator, 1G—bottom transverse header: 1H—Invar alloy tube; 2—metal connector, 3—Penning ion source; 3A—ferro-magnetic assembly; 3B—permanent magnetic steel ring (SmCO5); 3C—opposite cathode; 3D—anode; 3E—cathode; 3F—permanent magnetic steel ring(SmCo5); 3G—electric insulator; 3H—electric insulator; 4—ions leading out and focusing assembly; 4A—first plane lens: 4B—second plane lens; 4C—third plane lens; 4D—ceramic rings; 5—accelerating electrode; 6—ion beam drift tube; 6A—upper Ion beam drift tube: 6B—bottom Ion beam drift tube; 6C—welding seam; 7A—stainless steel cover; 7B—gas supply; 8—Gas absorber; 9—α-detector; 9A—transparent substrate for α-scintillator; 9B—α-scintillator; 9C—thin Invar alloy tube; 9D—photo multiplier tube; 9E—light guide; 10—target chamber; 10A—thick Invar alloy tube; 10B—upper header of target chamber, 10C—wall of target chamber; 10D—bottom header of target chamber; 11—α-particle collimator; 12—target; 13—high voltage power supply of α-STNG; 14—α-STNG; 15—shield; 16—formation for logging; 17—-scintillator; 18—cased-hole material layer; 19—-photo multiplier tube assembly; 20—electronics; 21—cement casing; 22—steel casing: 23—bore hole fluid; 24—high pressure housing; 25—fast timing electronics; 26—power supply.

DETAILED DESCRIPTION OF THE INVENTION

Embodiment 1

Figures 4A, 4B, 4C:
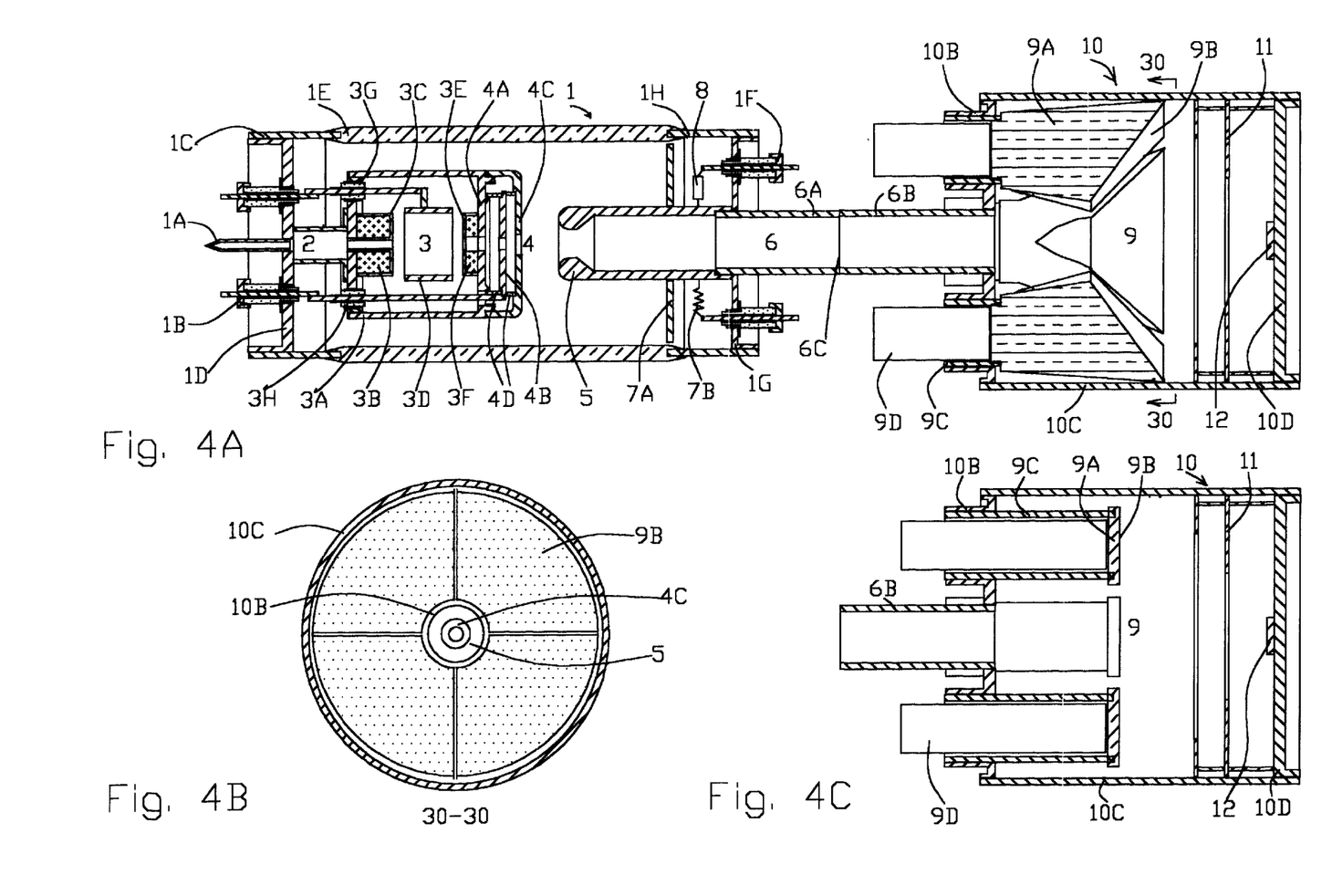
FIG. 4A is a view in longitudinal section of the α-STNG according to a first embodiment of the invention.
FIG. 4B is a transverse view of the α-STNG shown in FIG. 4A, taken along the line 30—30 and viewing in the direction of the arrows, wherein the α-scintillator is disposed along the longitudinal axis of the target chamber.
FIG. 4C is a view in longitudinal section of the target chamber in an α-STNG according to another embodiment of the invention.

Referring to FIG. 4A and FIG. 4B, pinch-off tabulation 1A, gas-tight insulator 1B, Invar alloy tube 1C, upper transverse header 1D, hollow cylindrical tube of glass or ceramic 1E, gas-tight insulator 1F, Invar alloy tube 1G, bottom transverse header 1H and ion beam drift tube 6A are welded or fused together to form a gas-tight envelope 1, its longitudinal axis is taken as that of the α-STNG. The ferro-magnetic assembly 3A, permanent magnetic steel rings 3B, 3F, cathode 3C, 3E and Anode 3D are combined to form a Penning ion source 3. The Penning ion source 3 is mounted on the gas-tight envelope 1 coaxially with the axis of α-STNG by metal connector 2. The anode 3D is connected to the central lead in one gas-tight insulator 1B by a conductor rod, which is fixed in an electric insulator 3G.

An ion leading out and focusing assembly 4 is disposed coaxially with said axis between the Penning ion source 3 and accelerating electrode 5. The assembly 4 comprises a plurality of plane lenses disposed coaxially with said axis. Three plane lenses are adopted in this embodiment. The first plane lens 4A acts as the perforated bottom header of Penning ion source 3, the third plane lens 4C is an end cap of stainless steel with a central aperture and is fixed on the Penning ion source. The second plane lens 4B is an annulus of stainless steel with a central aperture, and is gripped between two ceramics rings 4D, which are gripped by the first lens 4A and the third lens 4C coaxially with said axis. The lens 4B is connected to a central lead in another gas-tight insulator by a conductor, which is fixed in an electric insulator 3H. The energy and the emission direction of ions emitted from the ion source 3 cannot be expressed by an analytical-function, but an analogue of them can be obtained by using the Monte-Carlo method. The target 12 and accelerating electrode 5 have ground potential, a positive accelerating potential of about 120 kV relative to ground is applied to the cathodes 3C, 3E of the Penning ion source 3 and the third plane lens 4C. A positive ionizing potential of about 2000 volts direct current (DC) relative to the cathode 3C is applied to the anode 3D, and a negative focusing potential of about 3000 volts direct current (DC) relative to the cathode 3C is applied to the second plane lens 4B. The diameter of target 12 is about 10 mm ; the distance from the third plane lens 4C to target 12 is about 200 mm . An ion optics program is used to adjust the diameter of the apertures of the plane lens 4A, 4B, 4C and accelerating electrode 5, and the gaps between each other so as a satisfactory ion beam intensity and hitting accuracy of the beam can be obtained.

The stainless steel cover 7A, Invar alloy tube 1C, bottom transverse header 1G and ion beam drift tube 6A form a chamber which is connected to ground; the gas supply 7B and gas absorber 8 are fixed in the chamber for protecting them from being bombarded by charged particles. The structure of the gas absorber 8 is the same as that of the gas supply, but it is outgassed with high temperature after the deuterium or deuterium-tritium mixture has been absorbed by the gas supply 7B.

The ion beam drift tube 6B is welded at one end into the circular central aperture of upper header 10B. There are a plurality of annular apertures surrounding the central aperture on the upper header 10B. An individual small α-detector is welded into each circular aperture from the other side of the upper header 10B. Target 12 is fixed into the center recess of the bottom header 10D. An α particle collimator 11 is mounted on the bottom header 10D. The upper header 10B, the wall of target chamber 10C and bottom header 10D are welded with each other respectively to form a target chamber 10. The ion beam drift tube 6A on the gas-tight envelope 1 is welded at its end coaxially to the end of the ion beam drift tube 6B on target chamber 10 to form a unoutgassed α-STNG.

N (n=4 in this embodiment) individual small α-detectors 9, mounted on the upper header and surrounding the longitudinal axis of target chamber 10, form an α-detector assembly that has an annular contour, it is named simply as an annular α-detector. Each of the α-detectors comprises a scintillator 9B, special shaped glass light guide and photo multiplier tube 9D, wherein said special shaped glass light guide is used as the substrate 9A of said scintillator 9B, said scintillator 9B is fabricated on a special shaped end surface of said glass light guide. The special shaped end surface is similar to a portion of the lateral surface of a conical frustum, the combination of a plurality of the end surfaces looks like a complete or nearly complete lateral surface of a conical frustum (see FIG. 4B). The other circular end of said special shaped glass light guide is welded onto one end of an Invar alloy tube 9C, while the other end of said Invar alloy tube 9C is welded into a welding aperture of said header 10B of the target chamber, and said photo multiplier tube 9D is disposed within said Invar alloy tube 9C.

A α-particle collimator 11 is mounted between the annular α-detector 9 and the target 12 in the target chamber. The collimator 11 is formed with a plurality of annular plates or flakes of stainless steel that have different diameters of apertures. The annular flakes are mounted together according to the size of the diameters of the apertures to form an approximately conic passageway, through which the prompt associated α particles in predetermined sterad are permitted to move from target 12 to α-detector 9, but the scattered α particles are prevented from being accepted by α-detector 9.

It is completed for clearing, expelling gases from structural components, assembling, expelling gases from entire assembly, absorbing gases by gas supply and pinching off the exhaust tabulation through conventional process.

The neutron yield of the α-STNG in this embodiment is about $10^7$ cps satisfying the requirement of APTOF-C/OWLA. When the carbon window is taken as 3.17 to 4.65 Mev and the oxygen window is 4.68 to 6.43 Mev, the difference between the C/O value logged on calibration oil well and the C/O value logged on calibration water well is more than 0.35.

Embodiment 2

The structure of the α-STNG in this embodiment is the same as that in embodiment 1 except that the surface of the glass substrate 9A on which the a scintillator 9B is manufactured is similar to one side of a frustum of pyramid, rather than that of a conical frustum.

Embodiment 3

The structure of α-STNG in this embodiment is the same as that in embodiment 1 except for the glass substrate 9A of α-scintillator 9B. Referring to FIG. 4C, the individual small α detectors comprise: a scintillator 9B, a circular sheet of glass and a photo multiplier tube 9D, wherein said circular sheet of glass is used as the substrate 9A of said scintillator 9B, said circular sheet of glass is welded on one end of an Invar alloy tube 9C, said scintillator 9B is fabricated on the outer surface of said circular sheet of glass on the weldment, the other end of said Invar tube 9C is welded into a welding aperture in the upper header 10B of said target chamber, and said photo multiplier tube 9D is disposed within said Invar alloy tube 9C.

Embodiment 4

Figures 5A, 5B, 5C:
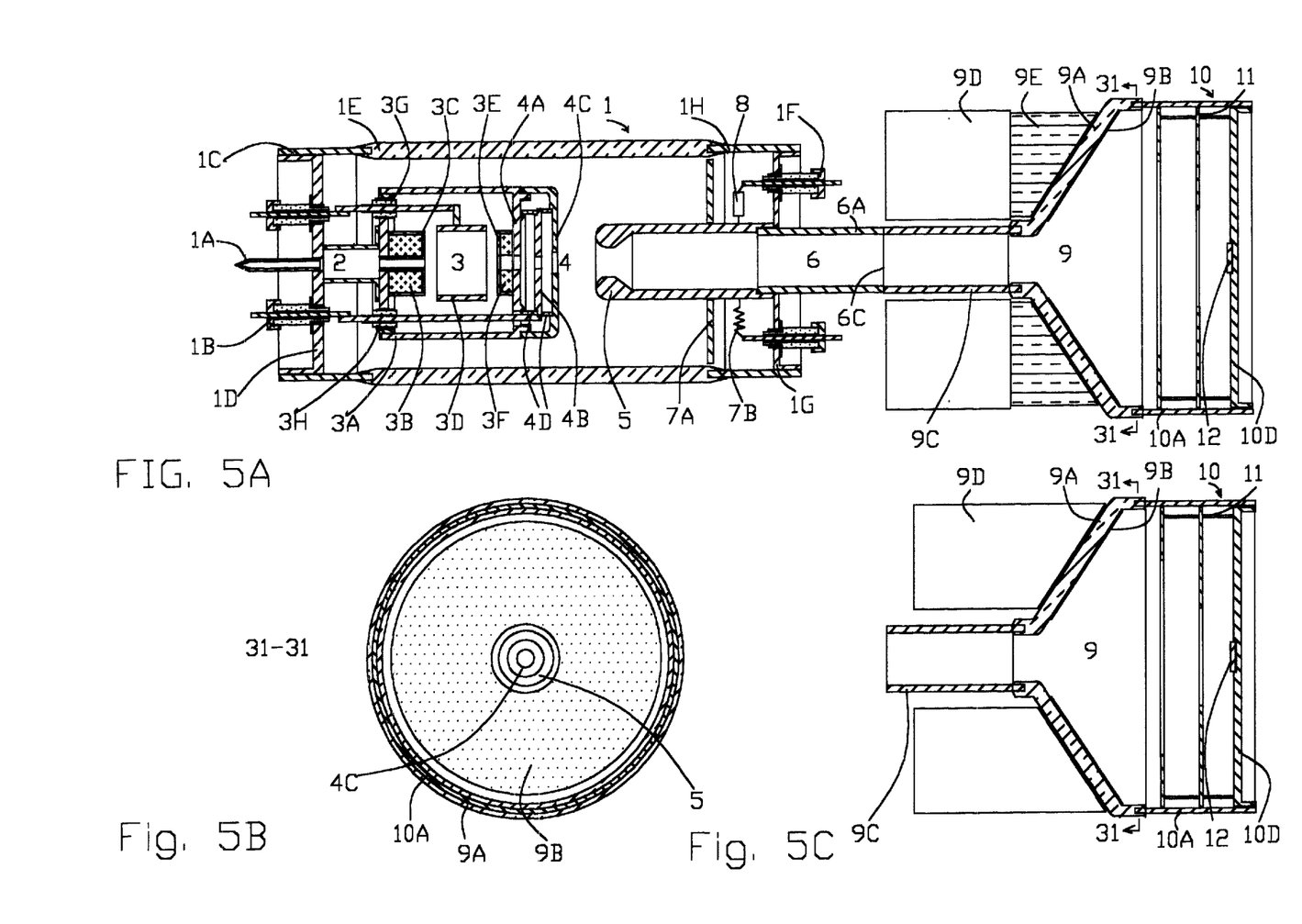
FIG. 5A is a view in longitudinal section of the target chamber in an α-STNG according to yet another embodiment of the invention.
FIG. 5B is a transverse view of the target chamber shown in FIG. 5A, taken along the line 31—31 and viewing in the direction of the arrows, wherein the shape of the α-scintillator is similar to an annulus.
FIG. 5C is a view in longitudinal section of the target chamber in a α-STNG according to a further embodiment of the invention its transverse view taken along line 31—31 and viewing in the direction of the arrows is shown in FIG. 5B.

The structure of the α-STNG in this embodiment is the same as that in embodiment 1 except for the annular α-detector (9) and target chamber 10. Referring to FIG. 5A, the annular α-detector 9 in this embodiment comprises a single integral α-scintillator 9B and a plurality of photo multiplier tubes 9D. The substrate 9A of the α-scintillator 9B is a funnel-shaped glass lid, the outer surface and inner surface thereof both are similar to the outer surface of a frustum of circular cone or a frustum of a pyramid, the α-scintillator 9B is manufactured on the inner surface of scintillator 9B. Referring to FIG. 5B, the glass substrate 9A is fused on its slender end onto the thin Invar alloy tube 9C, and on its thick end to one end of the thick Invar alloy tube 10A. The other end of the Invar alloy tube 10A is welded on the bottom header 10D to form a target chamber 10. The other end of the Invar alloy tube 9C is welded on the outer end of the beam drift tube 6A on the gas-tight envelope 1 to obtain a unoutgassed α-STNG. The special shaped light guide 9E is used to achieve good optical coupling. One end of the special shaped light guide 9E is matched with the photo multiplier tube 9D selected on cross section, and another end has a surface, which is the same as a part of the outer surface of the glass substrate 9A. Different number or different type of photo multiplier tube 9D can be assembled flexibly as long as the dimension of the light guide 9E is changed based on the requirement.

Embodiment 5

Referring to FIG. 5C, the structure of the α-STNG in this embodiment is the same as that in embodiment 4 except that the photo tubes 9D are assembled directly on the outer surface of the glass substrate 9A. The photo multiplier tubes 9D have an inclined end suffice, which is able to be directly optically coupled to the outer surface of the funnel-shaped glass lid substrate 9A in different manners, for example, using transparent silicon rubber or the like.

What is claimed is:

1. A sealed tube neutron generator (α-STNG) incorporating an internal associated α-detector for well logging, comprising:
    a gas-tight envelope (1) that has a longitudinal axis; a Penning ion source (3); a gas supply (7B); an accelerating electrode (5); and a target (12), wherein said Penning ion source (3) and said accelerating electrode (5) are mounted in said gas-tight envelope (1) coaxially with said axis, said gas supply (7B) being fixed in a gas-supply chamber in said gas-tight envelope (1), said α-STNG further comprising
    a cylindrical target chamber (10) having an upper header (10B) and a bottom header (10D) within which said target (12) is fixed in a central recess in the bottom header (10D);
    an ion leading out and focusing assembly (4) disposed between said Penning ion source (3) and said accelerating electrode (5);
    an ion beam drift tube (6) by which said gas-tight envelope (1) and said target chamber (10) are joined coaxially with said axis;
    a scintillation α-detector assembly (9) which comprises at least two individual small scintillation α-detectors surrounding said axis and mounted between the upper header (10B) and said target (12) in said target chamber (10); and
    an α-particle collimator (11) mounted between the α-detector assembly (9) and the target (12) in said target chamber (10).

2. A sealed tube neutron generator (α-STNG) incorporating an internal associated α-detector for well logging, comprising:
    a gas-tight envelope (1) that has a longitudinal axis; a Penning ion source (3); a gas supply (7B); an accelerating electrode (5); and a target (12), wherein said Penning ion source (3) and said accelerating electrode (5) are mounted in gas-tight envelope (1) coaxially with said axis, said gas supply (7B) is fixed in a gas-supply chamber in the gas-tight envelope (1); said α-STNG farther comprising:
    a cylindrical target chamber (10) having an upper header (10B) and a bottom header (10D) within which said target (12) is fixed in a central recess in the bottom header (10D);
    an ion leading out and focusing assembly (4) disposed between said Penning ion source (3) and said accelerating electrode (5);
    an ion beam drift tube (6) by which said gas-tight envelope (1) and said target chamber (10) are joined coaxially with said axis;
    a scintillation α-detector (9), located between said ion beam drift tube (6) and said target (12), consisting of a plurality of photo multiplier tubes (9D) and an integral annular α-scintillator (9B) which is manufactured on a transparent rigid substrate (9A) taken as the upper header (10B) of said target chamber (10); and
    an α-particle collimator (11) mounted between the α-detector (9) and the target (12) in said target chamber (10).

3. The α-STNG according to claim 1 or claim 2, further comprising a gas absorber (8) fixed in said gas supply chamber (1).

4. The α-STNG according to claim 1 or 2, wherein said α-particle collimator (11) is formed of a plurality of annular metallic flakes with different diameters of apertures arranged sequentially according to the size of the diameters.

5. The α-STNG according to claim 1 or 2, wherein said ion leading out and focusing assembly consists of a plurality of lenses that are fixed coaxially with said longitudinal axis sequentially.

6. The α-STNG according to claim 5, wherein said ion leading out and focusing assembly (4) consists of three annular plane lenses (4A), (4B) and (4C).

7. The α-STNG according to claim 6, the first plane lens (4A) serving as the bottom header of said Penning ion source (3), the second plane lens (4B) being a centrally perforated circular sheet of heat-resistant nonmagnetic metal, the third plane lens (4C) being a centrally perforated nonmagnetic lid of stainless steel that is fixed on said Penning ion source (3).

8. The α-STNG according to claim 1, wherein said individual small α-detector (9) comprise a scintillator (9B), a shaped light guide of glass and a photo multiplier tube (9D); said light guide of glass forming the rigid substrate (9A) for said scintillator (9B), a round end of said light guide of glass is fused to an end of an Invar alloy tube (9C), said scintillator (9B) is manufactured on the surface of another end of said light guide of glass, another end of said Invar alloy tube (9C) is welded into a welding-aperture in the upper header (10B) of said target chamber (10), and said photo multiplier tube (9D) is put into said Invar alloy tube (9C).

9. The α-STNG according to claim 8, wherein the shape of said α-scintillator (9B) for the individual small α-detector (9) is similar to a part of the outer surface of a frustum of a circular cone.

10. The α-STNG according to claim 8, wherein the shape of said α-scintillator (9B) for the individual small α-detector (9) is similar to one of the outer surfaces of a frustum of a pyramid.

11. The α-STNG according to claim 1, wherein said individual small α-detector comprises a scintillator (9B), a circular sheet of glass and a photo multiplier tube (9D); wherein said circular sheet of glass forms the rigid substrate (9A) for said scintillator (9B), said circular sheet of glass is fused on one end of an Invar alloy tube (9C), said scintillator (9B) is manufactured on an outer surface of said circular sheet of glass (9A), another end of said Invar alloy tube (9C) is welded into the welding aperture in the upper header (10B) of said target chamber (10), and said photo multiplier tube (9D) is put into said Invar alloy tube (9C).

12. The α-STNG according to claim 2, wherein said rigid transparent substrate (9A) is a funnel-like glass lid with both outer and inner surfaces similar to the lateral surfaces of a frustum of a circular cone or pyramid, having slender and thick ends which are longitudinally, coaxially welded on one end of a slender Invar alloy tube (9C) and one end of a thick Invar alloy tube (10A), respectively, another end of said thick alloy tube (10A) is welded on said bottom header (10D) of the target chamber to form a target chamber (10), another end of said slender Invar alloy tube (9C) is longitudinally, coaxially welded on the outlet of said ion beam drift tube (6) on said gas-tight envelope (1), and said photo multiplier tubes (9D) are assembled with said rigid transparent substrate (9A) while surrounding said ion beam drift tube (6A).

13. The α-STNG according to claim 12, wherein said photo multiplier tubes (9D) are optically coupled with the outer surface of said transparent rigid substrate (9A) for α-scintillator (9B) by a shaped light guide (9E).

14. The α-STNG of claim 12, wherein said photo multiplier tubes (9D) are optically coupled with the outer surface of said transparent rigid substrate (9A) for the α-scintillator (9B) by a thin layer of a transparent medium.

15. The α-STNG of claim 14, wherein said photo multiplier tubes (9D) have an inclined light cathode end surface.

* * * * *